May 23, 1961 P. S. MORGAN 2,985,057

COMBINED PRAXINOSCOPE AND PHONOGRAPH

Filed March 19, 1954 2 Sheets-Sheet 1

INVENTOR

Porter S. Morgan

BY Johnson and Kline

ATTORNEYS

COMBINED PRAXINOSCOPE AND PHONOGRAPH

Filed March 19, 1954

INVENTOR
Porter S. Morgan
BY
Johnson and Kline
ATTORNEYS

United States Patent Office 2,985,057

Patented May 23, 1961

2,985,057

COMBINED PRAXINOSCOPE AND PHONOGRAPH

Porter S. Morgan, Westport, Conn., assignor to Morgan Development Laboratories, Inc., Westport, Conn., a corporation of Delaware Filed Mar. 19, 1954, Ser. No. 417,348

5 Claims. (Cl. 88—16.2)

This invention relates to phonograph records and to an amusement device for use therewith.

An object of the present invention is to provide an arrangement whereby a showing of animated pictures may be combined with music or other audible sound produced by a photograph record, preferably in synchronism, which is so simple that it can be used by any child sufficiently advanced to apply and remove disk records from a phonograph turntable, and so constituted that it can be employed on any existing phonograph without altering the construction thereof, and so economical that its cost is negligible. To this end the present invention provides a phonograph record having on a face (or both faces) thereof a continuous succession of angularly spaced views in progressively changing attitudes of movement which may be related in kind and movement to the music or sound produced by the record, and a drum-like viewing device to be removably supported on the turntable supporting the record to be coaxial therewith, and having a circular succession of light reflecting mirrors or other like surfaces by which the pictorial representations on the record may be viewed in animation, as the record and viewing device rotate, by reason of the praxinographic effect. The picture may be viewed from any angular position around the turntable in which there is no obstructing structure on the phonograph itself. No special light is necessary since any incidental light falling on the top surface of the record is readily picked up by the mirror facets and from the latter reflected to the eyes of the viewer.

By arranging the number of successive pictures with relation to the number of facets on the view device mirror, various effects may be had. For instance, if the number of pictures and number of facets is the same, the action is viewed as static, i.e. non-traveling. By increasing the number of pictures, the view creeps forwardly in the direction of rotation of the record and by decreasing the number of pictures, the view creeps in the opposite direction. Thus, if the subject of the record is a march, the pictures can be arranged so that a succession of soldiers will appear to be marching past the point being viewed.

Preferably the view mirror structure covers only the center label-carrying part of the record and therefore does not limit the amount of sound-groove area normally used. The viewing mirror preferably has a bottom plate, which may be provided with friction material where it rests upon the record, and this plate has a central hole to slidingly fit over the end of the turntable shaft to centralize the mirror drum on the turntable.

The phonograph record of the present invention is a disk, having a continuous succession of angularly spaced pictures on its top side (and on both sides in a double-side record), the successive pictures depicting progressive changes in attitudes of movement. According to the present invention, the pictures are located in the sound-groove area of the record and thus do not interfere with or reduce the reproducing area. To avoid distortion of a true-drawn picture, regardless of the radial position thereof on the record, and to facilitate viewing the picture when the viewer's eye-level is low, say about even with the plane on the turntable, the mirror facets may be inclined outwardly, preferably on a curve.

Figure 1:
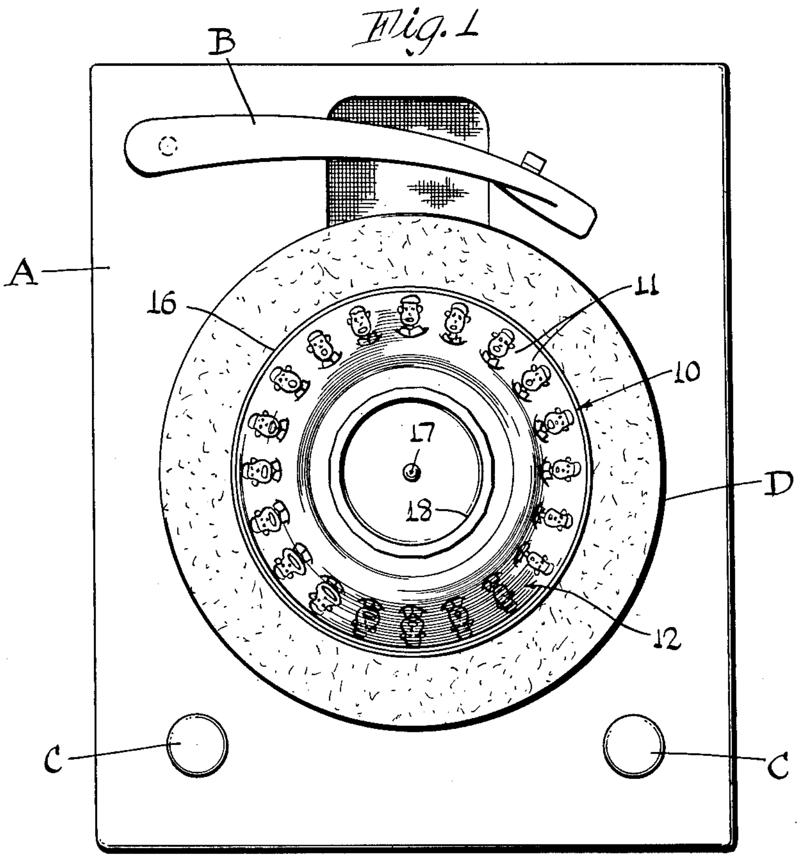
Figure 1 is a plan view of a phonograph showing my invention applied thereto.
Figure 2:
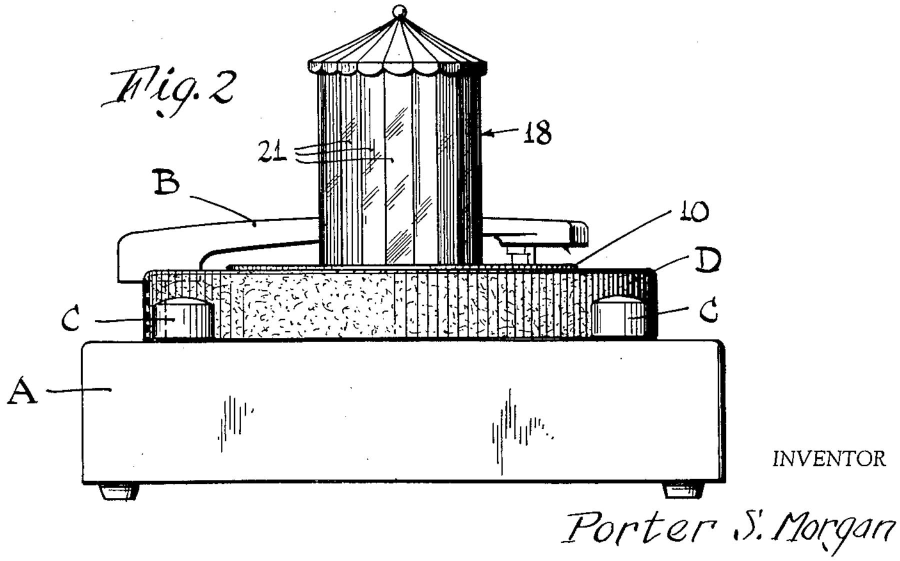
Fig. 2 is a front elevation of the parts shown in Fig. 1 with an ornamental cap on the viewing drum.
Figure 3:
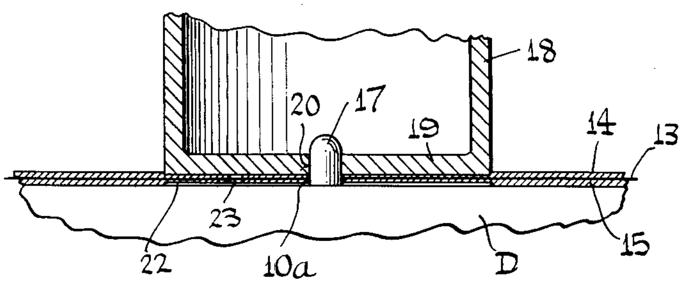
Fig. 3 is a vertical section taken through the viewing drum and record showing these parts supported on a phonograph turntable.
Figure 4:
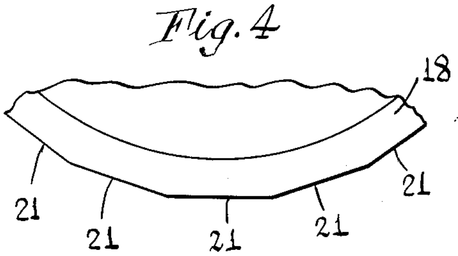
Fig. 4 shows a fragment of one form of the viewing drum in which the faces of the mirror panels are flat in their horizontal planes.

The disk-type phonograph shown in Figs. 1 and 2 may be of any suitable kind and construction. It has a casing A containing the usual parts such as a motor, amplifier, speaker, etc., a pickup arm B, controls C and a turntable D.

While the present invention is of general utility, it is intended to supply added interest and pleasure over a mere sound reproducer to children of the nursery school age or younger, since it combines both sight and sound, usually in the form of music related to the subject or action on praxinoscopic pictures. For instance, the music of the march "Parade of the Wooden Soldiers" according to the present invention would have a new meaning for a young child when its playing is accompanied by action-pictures of wooden soldiers on parade.

For use by such young children, the device must of course be simple to operate. This need has been met by the present invention which, in addition to the phonograph record of this invention (which is no more difficult to use than ordinary disk records), requires only one part—a simple drum which can be placed on and removed from a record as easily as the record is placed on the turntable. As will appear below, both the record and the viewing drum can be made of plastic material so as to be virtually unbreakable by young children.

According to the present invention, the phonograph record disk 10 may be made in any suitable manner to have a circular succession of pictures 11 angularly equispaced and depicting progressively changing attitudes of movement. However, to allow the pictures to be made as large as possible, the better to be viewed, the pictures according to the present invention are placed near the periphery of the disk in the area of the sound track or groove 12 of the record. To permit this to be conveniently arranged the record is preferably made as a laminated plate, the action pictures 11 and other ornamentation being printed on a disk 13 of paper or cardboard over which is molded a layer 14 of transparent plastic material, such for instance as vinylite or cellulose acetate, which as molded contains the sound track 12. In the case of a two-sided record, which is usual, each side of the disk 13 carries pictures 11, and a layer 15 of plastic material is formed on the underside of the disk 13, the layers 14 and 15 preferably extending slightly beyond the periphery 16 of the disk 13, so that their peripheral edges may unite and seal-in the disk 13.

The sound tracks 12 are preferably formed as an incident to the molding of the layers 14 and 15.

The record disk 10 has a central hole 10*a* to receive the center post 17 of a phonograph turntable to axially align the disk and table.

The record disk disclosed herein is described and claimed in my copending application Serial No. 579,235, filed April 19, 1956.

The viewing of the pictures 11, as the phonograph operates and the record rotates, is accomplished by means of a reflecting drum 18 which, as shown, has a bottom 19 adapted to rest on the center or label-carrying portion of the record to rotate therewith, the bottom having an aperture 20 to receive the center post 17 of the turntable.

The viewing or reflecting drum 18 has a circular succession of mirror panels 21 in juxtaposed relation forming a polygonal outline. There is a determinate number of panels 21 and this is related to the number of pictures 11 on the record. The number of panels should be such as to give a smooth flow of images on the drum which at the speed of the turntable and disk avoids jerky movements as viewed.

When the reflecting drum 18 is placed on a record 10 as shown in Fig. 1 and the record and drum are rotated, light falling on the record will be picked up and reflected by the mirror panels 21 to the eyes of the viewer as each panel reaches a position substantially at right angles to the line of vision of the viewer, the optical image persisting as the drum rotates to bring the next and succeeding panels to such position according to the praxinoscopic principle.

In a praxinoscope the action pictures and the reflecting drum are disposed in concentrically-spaced, substantially parallel planes and considerable special illumination is required to make the pictures discernible in the mirror drum. I have discovered, however, that excellent viewing results may be obtained when, as herein illustrated, the pictures lie in a plane at a substantial angle to that of the mirror panels; that is to say, when the pictures are in a horizontal plane, and the mirror panels are in a more or less vertical plane. When, as here, the pictures are in a horizontal plane, in a room with sufficient illumination for reading in the vicinity of the phonograph, no additional illumination is necessary to observe the reflection of the action pictures carried by the record, the light present falling on the horizontal record being sufficient to make the reflected images clearly and easily seen.

At this point it should be noted that the pictures 11 are made in mirror-reverse when there is a right-hand or left-hand side to each picture and that the pictures are radially disposed with the bottoms of the pictures directed toward the center of the disk so that the pictures will appear in natural position as viewed on the mirror panels.

Figure 8:
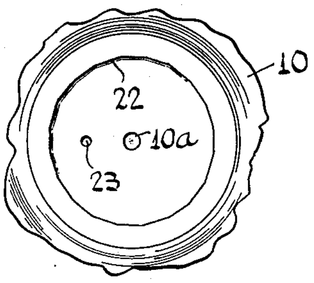
Fig. 8 is a fragmentary view of the central portion of a record made according to the present invention showing the polygonal recess for receiving the viewing drum and a locating hole in the picture disk for positioning the latter relative to the recess.

When the action to be depicted is within the picture itself as in the case of the pictures of a laughing clown as shown in Fig. 1, that is to say, when the subject is immobile as a whole, there are as many pictures 11 on the record as there are mirror panels on the drum. In this situation, substantial radial alignment of the pictures 11 with the mirror panels 21 should be maintained. For this purpose the record 10 may have a recess 22 of polygonal outline to receive and substantially fit the end of the reflecting drum (see Fig. 8). There is a recess 22 on each side of the record and these may be formed when the record disk is being molded. To facilitate the arcuate alignment of the recess 22 and the paper disk 13 the latter may be provided with an aligning hole 23 as shown in Fig. 8 which cooperates with an aligning pin on the molding die.

However, when the action depicted is to be mobile, as in the case of successive leaping animals or parading soldiers, if the action is to proceed in the direction of turntable rotation, there will be one more picture 11 than there are mirror panels, so that in each successively appearing picture the moving object will appear nearer to the leading edge of the mirror panel and will gradually disappear therefrom as another appears at the trailing edge of the panel. If the action is to proceed counter to the direction of rotation of the record there will be one less picture 11 than mirror panels.

The reflecting drum 18 may be made in any suitable manner. For instance, it may be made of metal having polished mirror panels or it may have a body to which glass mirrors are attached. However, for economy and convenience, it is preferable to mold the drum 18 as one piece of opaque plastic material. If the molding is performed with polished vacuum molds and opaque material is used the surfaces of the panels 21 can have highly reflective snurface mirrors. Such drums are light in weight and virtually unbreakable, both important features where young children are concerned.

Figure 6:
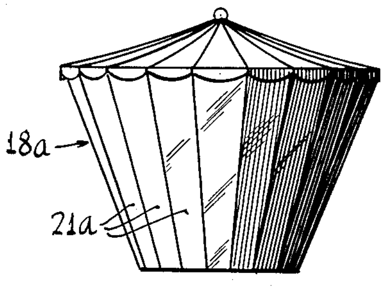
Fig. 6 is an elevation of a viewing mirror in which the mirror panels incline outwardly as they extend upwardly.
Figure 7:
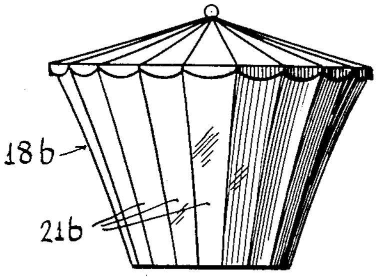
Fig. 7 is a view like Fig. 6 but showing a viewing drum with the mirror panels inclined outwardly along a curve as they extend upwardly.

When, as shown in Fig. 1, the mirror panels 21 are located perpendicular to the record the eye level of the child or other person must be substantially above the plane of the record disk to observe the pictures in the reflecting drum. This would require that the phonograph be placed quite low for small children. To avoid this, the drum can be so formed that the panels incline upwardly and outwardly. For instance, as shown in Fig. 6, the panels 21*a* may be substantially flat in a vertical plane but extend outwardly and upwardly. I have found that when the panels are inclined approximately 15 degrees from the perpendicular all portions of the action pictures may be in focus when viewed. If desired the drum, as in the case of the drum 18*b* shown in Fig. 7, may have the panels concavely curved as they extend outwardly and upwardly, the chord of the arc formed by the curve being preferably 15 degrees displaced from the perpendicular. When the panels are so curved, the action picture will be enlarged as seen in a vertical plane. In both the form shown in Fig. 6 where the panels 21*a* are flat vertically and that shown in Fig. 7 in which the panels 21*b* are curved vertically, the reflection in the mirror surfaces may be seen with the eye level at about level with the plane of the record.

The reflecting mirror disclosed herein is described and claimed in my copending application Serial No. 579,234, filed April 19, 1956, now Patent No. 2,955,509, granted October 11, 1960.

For best results, I have discovered that the effective radius of the reflecting drum should be one-half the distance from any part of the action picture to the center of rotation, i.e. the axis of the turntable, record and drum. For instance, assuming that the innermost portion of the action picture is two and one-half inches from the axis of the record and drum, the lowermost portion of the upwardly and outwardly inclining mirror panel should be spaced approximately one and a quarter inches from the axis of the drum. When the outermost portion of the action picture is say three inches from the center of the record the upper portion of the mirror panel should be approximately one and a half inches from the axis of the drum.

Figure 5:
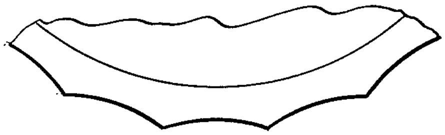
Fig. 5 is a view like Fig. 4 but showing the faces of the mirror panels concave in their horizontal planes.

The panels 21 may be curved in a horizontal plane as shown in Fig. 5 and when this is done, the reflected image will be enlarged horizontally. Hence, by curving the panels 21 both vertically and horizontally, the reflected image from the action pictures may be enlarged in natural form.

It is within the scope of this invention to attenuate or foreshorten the pictures 11 either in height or in width, so that when reflected by the reflecting drum the image will appear natural. However, since the circular succession of pictures 11 in and of themselves may have considerable interest and amusement value when observed directly, as when the record is held in the hands, it is preferable that the pictures be true and undistorted views and this is accomplished by arranging the reflecting drum as above described.

It is to be understood that the recording on a record will usually be related to the picture material and that the action in the picture will be in synchronism with the rhythm of the music, hence one or more cycles of movement will usually be completed in each revolution of the record. When the recording is properly made and the pictures properly drawn, the desired synchronism cannot be disturbed since the layers 14 and 15 and the picture disk become as one after the record is molded. The aperture 23 in the picture disk may advantageously be employed to predeterminately position the picture disk 13 in the molding dies to assure its proper position relative to the sound track.

While, as illustrated herein, the number of pictures is equal or substantially equal to the number of panels, since the reflecting panels are the optimum distance from the pictures, the pictures may be differently placed and may be different in numbers. For instance, with a reflecting drum having a radius of about one and a quarter inches and twenty (20) panels, if the pictures were spaced say four inches from the axis of the record, only sixteen (16) pictures would be required, the pictures being so positioned around the record that in static condition a complete picture image may appear on two adjacent mirror panels.

Variations and modifications may be made within the scope of the claims and portions of the improvements may be used without others.

I claim:

1. An attachment for a phonograph having a horizontal turntable provided with a central vertically projecting spindle and means for rotating the turntable, said attachment comprising a flat picture-carrying disk having a central aperture to be removably supported on the turntable for rotation therewith, with the spindle projecting through the aperture, said disk having on at least the upper face thereof a succession of angularly spaced pictures disposed within an annular band on the disk and in mirror reverse with the bottoms of the pictures directed towards the center of the disk, and a cooperating reflecting drum having a central aperture to receive said spindle and be removably positioned thereby concentrically with the disk so as to extend upwardly with relation to the turntable and said one face of the disk and rotate continuously with, and in the same direction as the disk and turntable, said drum having a plurality of angularly related mirror panels on the outer surface thereof forming together a regular polygonal cross-sectional outline for reflecting successive pictures to a viewing position, the number of successive pictures having a predetermined relation to the number of mirror panels on the drum.

2. An attachment for a phonograph having a horizontal turntable provided with a central vertically projecting spindle and means for rotating the turntable, said attachment comprising a flat picture-carrying disk having a central aperture and removably supported on the turntable for rotation therewith with the spindle projecting through the aperture, said disk having on at least the upper face thereof a succession of angularly spaced pictures disposed within an annular band on the disk outside a central portion of substantial area, the pictures being in mirror reverse with their bottoms directed towards the center of the disk, and a cooperating reflecting drum having a centering aperture to receive the turntable spindle and a bottom forming a base to be removably supported on said central portion of the disk to be rotated by and with the disk, the sides of the drum extending upwardly with relation to the turntable and said one face of the disk, the sides of the drum having a plurality of mirror panels angularly related and forming together a regular polygonal cross-sectional outline for reflecting successive pictures to a viewing position located outwardly and above the plane of the disk, the number of successive pictures having a predetermined relation to the number of mirror panels on the drum.

3. An attachment for a phonograph having a horizontal turntable provided with a central vertically projecting spindle and means for rotating the turntable, said attachment comprising a flat picture-carrying disk having a central aperture and removably supported on the turntable for rotation therewith with the spindle projecting through the aperture, said disk having on at least the upper face thereof a succession of angularly spaced pictures disposed within an annular band of the disk and in mirror reverse with the bottoms of the pictures directed towards the center of the disk, and a cooperating inverted, truncated, pyramidal reflecting drum having a broad supporting base provided with a central aperture to receive said spindle and be removably positioned thereby concentrically with the disk so as to extend upwardly with relation to the turntable and said one face of the disk and rotate continuously with the disk and turntable, said drum having a plurality of trapezoidal mirror panels angularly spaced on the outer surface thereof forming together a regular polygonal cross-sectional outline for reflecting successive pictures to a viewing position, the number of successive pictures having a predetermined relation to the number of mirror panels on the drum.

4. An attachment for a phonograph having sound reproducing means and a horizontal turntable provided with a central vertically projecting spindle and means for rotating the turntable, said attachment comprising a flat disk having a central aperture and removably supported on the turntable for rotation therewith with the spindle projecting through the aperture, said disk having on at least the upper face thereof recorded sound grooves adapted to cooperate with said sound reproducing means and a succession of angularly spaced pictures disposed within an annular band on the disk and in mirror reverse with the bottoms of the pictures directed towards the center of the disk, and a cooperating reflecting drum having a central aperture to receive said spindle and be removably positioned thereby concentrically with the disk so as to extend upwardly with relation to the turntable and said one face of the disk and rotate continuously with the disk and turntable, said drum having a plurality of angularly related mirror panels on the outer surface thereof forming together a regular polygonal cross-sectional outline for reflecting successive pictures to a viewing position, the number of successive pictures having a predetermined relation to the number of mirror panels on the drum, and the sound recorded in said sound grooves and the pictures in said annular band being correlated.

5. The attachment as defined in claim 4 in which the recorded sound in said sound grooves is correlated as to subject matter with the pictures and has a predetermined rhythm correlated to the rhythm of the animation depicted by the successive pictures in said annular band.

References Cited in the file of this patent

UNITED STATES PATENTS

| | | |
|---|---|---|
| 887,716 | Xander | May 12, 1908 |
| 1,045,502 | Bingham | Nov. 26, 1912 |
| 1,214,863 | Woeste | Feb. 6, 1917 |
| 1,413,333 | Jenkins | Apr. 18, 1922 |
| 1,835,876 | Jenkins | Dec. 8, 1931 |
| 1,864,519 | Boularan et al. | June 28, 1932 |
| 1,913,913 | Boularan et al. | June 13, 1933 |
| 1,929,173 | Koch | Oct. 3, 1933 |
| 1,937,378 | Alexanderson | Nov. 28, 1933 |

(Other references on following page)

UNITED STATES PATENTS

| | | |
|---|---|---|
| 2,005,914 | Freund | June 25, 1935 |
| 2,092,761 | Klein | Sept. 14, 1937 |
| 2,561,971 | Bustanoby | July 24, 1951 |
| 2,587,433 | Bentley | Feb. 26, 1952 |

FOREIGN PATENTS

| | | |
|---|---|---|
| 629 | Great Britain | of 1867 |
| 4,244 | Great Britain | Nov. 13, 1877 |
| 22,569 | Great Britain | Apr. 18, 1912 |
| 609,967 | Great Britain | Oct. 8, 1948 |
| 120,484 | France | Aug. 30, 1877 |
| 272,022 | Italy | Feb. 26, 1930 |

OTHER REFERENCES

"Living Pictures," Hopwood, Second Edition 1915, published by The Hatton Press, London, England (pages 23–33 of interest, page 33 especially cited).

UNITED STATES PATENT OFFICE

CERTIFICATE OF CORRECTION

Patent No. 2,985,057 May 23, 1961

Porter S. Morgan

It is hereby certified that error appears in the above numbered patent requiring correction and that the said Letters Patent should read as corrected below.

Column 1, line 20, for "photograph" read -- phonograph --; column 2, line 38, for "on" read -- of --; column 4, line 18, for "snurface" read -- surface --.

Signed and sealed this 17th day of October 1961.

(SEAL)
Attest:

ERNEST W. SWIDER
Attesting Officer

DAVID L. LADD
Commissioner of Patents

USCOMM-DC